(12) United States Patent
Sonoda et al.

(10) Patent No.: US 10,434,614 B2
(45) Date of Patent: Oct. 8, 2019

(54) CONTROL DEVICE FOR MACHINE TOOL PERFORMING OSCILLATION CUTTING

(71) Applicant: FANUC CORPORATION, Yamanashi (JP)

(72) Inventors: Naoto Sonoda, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/951,544

(22) Filed: Apr. 12, 2018

(65) Prior Publication Data

US 2018/0297164 A1   Oct. 18, 2018

(30) Foreign Application Priority Data

Apr. 18, 2017   (JP) .................. 2017-082030

(51) Int. Cl.
  *B23Q 15/013*   (2006.01)
  *B23B 1/00*     (2006.01)
  *B23Q 15/14*    (2006.01)
  *B23B 25/02*    (2006.01)

(52) U.S. Cl.
  CPC .............. *B23Q 15/013* (2013.01); *B23B 1/00* (2013.01); *B23Q 15/14* (2013.01); *B23B 25/02* (2013.01); *B23Q 2701/02* (2013.01)

(58) Field of Classification Search
  None
  See application file for complete search history.

(56) References Cited

U.S. PATENT DOCUMENTS 10,268,176 B2 *  4/2019  Sannomiya ........ B23Q 15/0075
2018/0281139 A1 * 10/2018 Yamamoto .......... G05B 19/182
2018/0297163 A1 * 10/2018 Sonoda .............. B23Q 15/013

FOREIGN PATENT DOCUMENTS

| JP | 2006-172149 A  | 6/2006  |
| JP | 5033929 B1     | 9/2012  |
| JP | 5139592 B1     | 2/2013  |
| JP | 5599523 B1     | 10/2014 |
| JP | 2017-56515 A   | 3/2017  |
| JP | 2018-41275 A   | 3/2018  |
| WO | 2016/047485 A1 | 3/2016  |

\* cited by examiner

Primary Examiner — Ryan A Jarrett
(74) Attorney, Agent, or Firm — Hauptman Ham, LLP

(57) ABSTRACT

A control device includes a position command generation part, an oscillation command generation part, and a storage part for storing machining operation conditions and servo control conditions. The oscillation command generation part includes an estimation part which estimates an oscillation amplitude and an oscillation frequency of an oscillation command based on a rotation speed of a workpiece and a position command generated by the position command generation part, and a determination part which determines whether or not the estimated oscillation frequency is an optimum value based on the machining operation conditions and the servo control conditions.

8 Claims, 7 Drawing Sheets

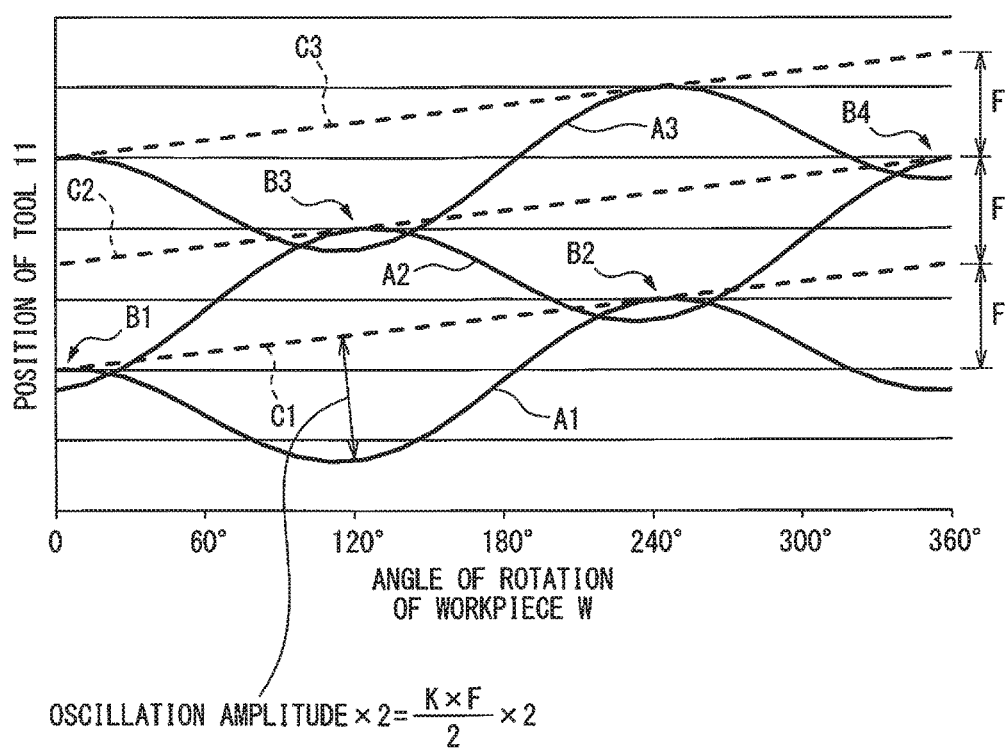

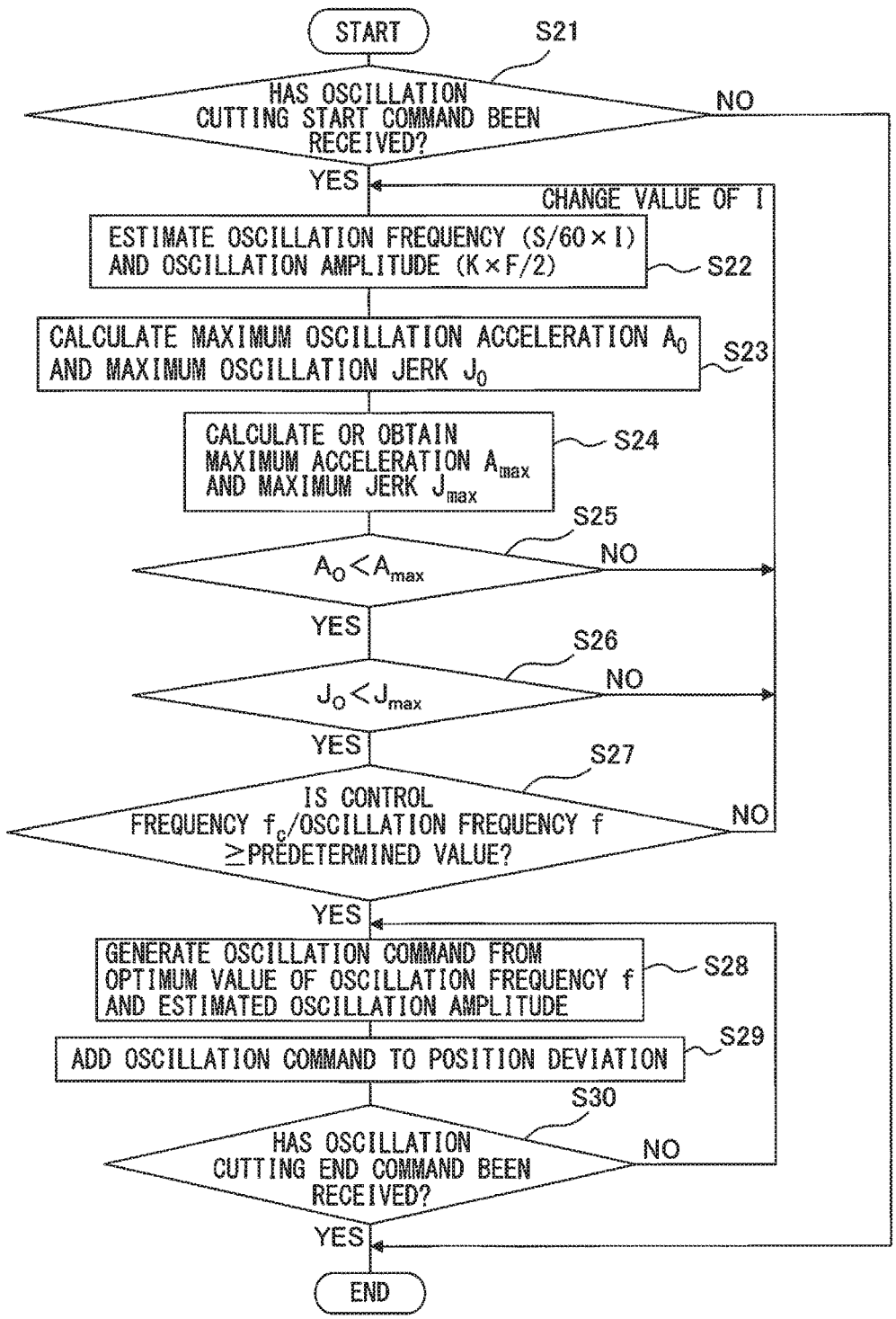

CONTROL DEVICE FOR MACHINE TOOL PERFORMING OSCILLATION CUTTING

RELATED APPLICATIONS

The present application claims priority to Japanese Patent Application No. 2017-082030 filed on Apr. 18, 2017, the disclosure of which is hereby incorporated by reference herein in its entirety.

BACKGROUND OF THE INVENTION

1. Field of the Invention

The present invention relates to a control device for a machine tool which performs oscillation cutting.

2. Description of the Related Art

When swarf is continuously generated during the machining of a workpiece using the cutting tool of a machine tool, the swarf may become entangled with the cutting tool. In such a case, it is necessary to stop the machine tool in order to remove the swarf from the cutting tool, which is time consuming and reduces production efficiency. Further, there is a risk that the workpiece may be damaged by the swarf, reducing the quality of the workpiece.

In order to avoid such drawbacks, oscillation cutting, in which swarf is shredded by oscillating the cutting tool relative to the workpiece in the machining feed direction, is known (refer to, for example, Japanese Patent No. 5033929, Japanese Patent No. 5139592, or Japanese Patent No. 5599523).

SUMMARY OF THE INVENTION

In the control device of the machine tool which performs oscillation cutting described above, by inputting a sinusoidal oscillation command to the servomotor which drives the feed mechanism for oscillating the cutting tool or workpiece, the cutting tool and workpiece are relatively oscillated. Conventionally, an operator determines the frequency of the oscillation command (which will be referred to as "oscillation frequency") according to machining conditions, machining operation conditions, servo control conditions, etc., so that the swarf of the workpiece is shredded as desired. However, when at least one of the machining conditions, machining operation conditions, and servo control conditions is changed, it is necessary to again obtain the oscillation frequency, which causes a problem of a significant load on the operator. Therefore, it is desired to automatically obtain the optimum value of the oscillation frequency of the oscillation command according to the machining conditions, machining operation conditions, and servo control conditions.

The first aspect of the present disclosure provides a control device for controlling a machine tool for cutting an outer peripheral surface or an inner peripheral surface of a workpiece with a tool, the machine tool having a main shaft for performing a relative rotation between the workpiece and the tool around a central axis of the workpiece, and at least one feed shaft for performing a relative feeding between the tool and the workpiece along a generatrix of the outer peripheral surface or the inner peripheral surface of the workpiece, the control device comprising:

a position command generation part for generating a position command for the at least one feed shaft based on a relative rotation speed of the workpiece and the tool and a relative feed speed of the tool and the workpiece;

a feed shaft control part that controls the at least one feed shaft according to the position command; and a storage part for storing the rotation speed, the feed speed, machining operation conditions under which oscillation is performed using the feed shaft, and servo control conditions for the control device; wherein the feed shaft control part includes an oscillation command generation part that generates an oscillation command for the at least one feed shaft such that the tool intermittently cuts the workpiece at an oscillation frequency which is a positive non-integral multiple of the rotation speed, and the feed shaft control part is configured to control the at least one feed shaft based on a resultant command obtained by adding the oscillation command to a position deviation, which is a difference between the position command and an actual position of the at least one feed shaft;

the oscillation command generation part includes an estimation part for estimating an oscillation amplitude and an oscillation frequency of the oscillation command based on the rotation speed and the position command, and a determination part for determining whether or not the oscillation frequency is an optimum value based on the machining operation conditions and the servo control conditions; and when the determination part determines that the oscillation frequency is an optimum value, the oscillation command is generated based on the optimum value of the oscillation frequency and the oscillation amplitude.

According to the above first aspect, in a machine tool performing oscillation cutting, when generating a periodic oscillation command to oscillate a tool and a workpiece relative to each other, the optimum value of the oscillation frequency of the oscillation command can be automatically obtained according to machining conditions, machining operation conditions, and servo control conditions.

The objects, features and advantages of the present invention, as well as other objects, features and advantages will be further clarified from the detailed description of the representative embodiments of the present disclosure shown in the accompanying drawings.

BRIEF DESCRIPTION OF THE DRAWINGS

FIG. 5 is a drawing showing the relationship between feed amount and angle of rotation.

FIG. 7 is a flowchart showing one example of the operations of the control device shown in FIG. 6.

DETAILED DESCRIPTION

Figure 1:
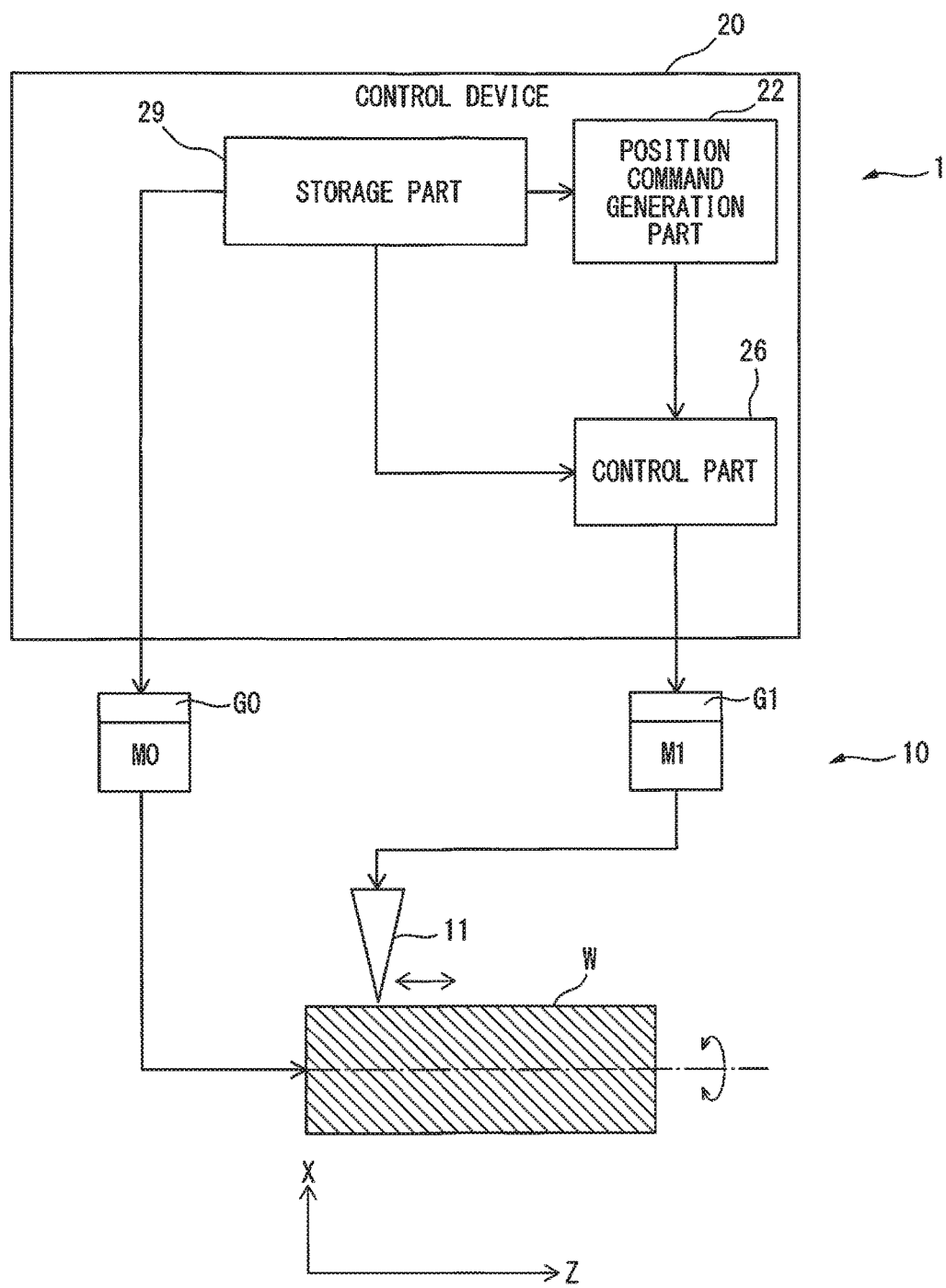
FIG. 1 is a view of a machining system including a control device of the first embodiment.

The embodiments of the present disclosure will be described with reference to the drawings. In the referenced drawings, the same components or functional elements are given the same reference numerals. For the ease of understanding, the drawings have been appropriately modified in scale. Further, the embodiments shown in the drawings are only examples for carrying out the present invention, and the present invention is not limited to the illustrated embodiments.

FIG. 1 shows a machining system 1 including a control device 20 of a first embodiment. As shown in FIG. 1, the machining system 1 includes a machine tool 10 and a control device 20 which controls the machine tool 10. The machine tool 10 includes a tool 11, and the tool 11 cuts a workpiece W having, for example, a cylindrical shape, a columnar shape, a conical shape, a frustoconical shape, or the like. In the example shown in FIG. 1, the tool 11 cuts the outer peripheral surface of the workpiece W formed from a cylinder. Furthermore, in FIG. 1, etc., the center axis of the workpiece W, which is the rotation axis of the workpiece W, is defined as the Z axis, and the axis perpendicular to the Z axis is defined as the X axis. The machine tool 10 can also cut the outer surface or the inner surface of a workpiece, such as a columnar body, having an elliptical cross section if the position of the tool 11 in the X axis direction is appropriately adjusted.

FIG. 1 shows a substantially columnar workpiece W. The main shaft M0 of the machine tool 10 rotates the workpiece W about its central axis. Further, the feed shaft M1 of the machine tool 10 can both move the tool 11 along the generatrix of the outer surface of the workpiece W and reciprocate, i.e., oscillate, the tool 11 along the generatrix of the outer surface of the workpiece W.

The main shaft M0 and the feed shaft M1 are those of servo motors. The feed shaft M1 cooperates with the main shaft M0 to feed the tool 11 and cut the workpiece W. Note that though the required torque for the main shaft M0 and the feed shaft M1 can be estimated, excluding the cutting load, from inertia and the angular acceleration of the command, detectors G0 and G1 for detecting torque may be provided.

The control device 20 is composed of a computer including a memory such as ROM (read-only memory) or RAM (random access memory), a CPU (control processing unit), and a communication control part, which are connected to each other through buses. Further, the control device 20 includes a position command generation part 22, an oscillation command generation part 23 (including the oscillation command estimation part 23a and determination part 23b shown in FIG. 6), an addition part 24, a control part 26 (feed shaft control part), and a storage part 29. The function or operation of each of these parts can be achieved through cooperation of the CPU, the memory, and the control program stored in the memory installed in the computer.

The storage part 29 of the control device 20 stores machining conditions of the workpiece W, machining operation conditions under which the tool 11 and the workpiece W are oscillated relative to each other using the feed shaft M1, and servo control conditions for the control device 20, etc.

A host computer (not shown), such as a CNC (computer numerical controller), a PLC (programmable logic controller), or the like, is connected to the control device 20, and the above-mentioned feed speed, rotation speed, machining operation conditions, servo control conditions, etc., may be input to the storage part 29 from the host computer. Furthermore, the storage part 29 and the position command generation part 22 may be provided not in the control device 20 but in the above host computer.

The machining conditions of the workpiece W include the relative rotation speed of the workpiece W and the tool 11 about the center axis of the workpiece W, the relative feed speed of the tool 11 and the workpiece W, and the position command of the feed shaft M1.

The above machining operation conditions are those in which the maximum oscillation acceleration and the maximum oscillation jerk obtained from the oscillation amplitude and the oscillation frequency of the oscillation command to relatively oscillate the tool 11 and the workpiece W are smaller than the maximum acceleration and the maximum jerk of the actually-moving object. In other words, the conditions are those which prevent an acceleration or jerk that is unacceptable for the moving object actually moving by the motor operated using the oscillation command. Regarding the oscillation frequency and the oscillation amplitude of the oscillation command, in Formula (1), which is described later, the value obtained from the expression S/60×I corresponds to the oscillation frequency, and the value obtained from the expression K×F/2 corresponds to the oscillation amplitude.

Note that, when the feed shaft M1 is the shaft of a linear motor, the maximum acceleration of the above moving object is obtained from the maximum thrust of the linear motor and the weight of the moving object moved by the linear motor. The moving object of this case is composed of a movable table part which is moved by the linear motor and a tool 11 or workpiece W supported by the movable table part.

When the feed shaft M1 is the shaft of a rotary motor, the maximum acceleration of the moving object is obtained from the maximum torque of the rotary motor and the inertia (moment of inertia) of the moving object moved by the rotary motor. The moving object of this case is composed of a ball screw drive mechanism having a movable table portion driven by the rotary motor, and a tool 11 or a workpiece W supported by the movable table portion of the ball screw drive mechanism.

The maximum jerk of the moving object is the allowable shock (jerk) of the moving object moved by the above linear motor or the rotary motor, and can be obtained by integrating the maximum acceleration of the moving object one time.

The servo control conditions are conditions obtained by comparing the aforementioned oscillation frequency of the oscillation command with a control frequency (so-called "sampling frequency") obtained from a predetermined control cycle when the command is sent to the feed shaft M1, so that the value obtained by dividing the sampling frequency by the oscillation frequency is not less than a predetermined value (e.g., 20).

Furthermore, the storage part 29 stores the machining program executed by the machine tool 10, and the CPU (not shown) in the control device 20 may read the above-mentioned rotation speed and feed speed as machining conditions from the machining program and output the same to the position command generation part 22 or the control part 26.

Furthermore, the maximum oscillation acceleration, maximum oscillation jerk, maximum acceleration, and maximum jerk included in the aforementioned machining operation conditions may be calculated in the host computer. Further, the predetermined control cycle or control frequency included in the servo control conditions described above may be read from the machining program by the CPU or may be stored in the storage part 29 in advance.

The position command generation part 22 of the control device 20 has the function of generating the position command of the feed shaft M1 based on the relative rotation speed of the workpiece W and the tool 11 about the center axis of the workpiece W and the relative feed speed of the tool 11 and the workpiece W. This position command is an instruction to furnish the control part 26 with the target position when the tool 11 and the workpiece W are moved relatively in the Z axis direction.

The control part 26 of the control device 20 includes an oscillation command generation part 23 (refer to FIG. 6) which generates an oscillation command of the feed shaft M1 based on the above-described rotation speed and feed speed so that the oscillation frequency becomes a positive, non-integral multiple with respect to the above-described rotation speed, and the tool 11 intermittently cuts the workpiece W. The oscillation command is a periodic command created so as to be asynchronous to the rotation speed about the central axis described above, and includes an oscillation frequency and an oscillation amplitude. In Formula (1) of the oscillation command, which is described later, the value obtained from the expression S/60×I corresponds to the oscillation frequency, and the value obtained from the expression K×F/2 in Formula (1) corresponds to the oscillation amplitude.

Note that, intermittent cutting means that the tool 11 cuts the workpiece W while periodically contacting with and separating from the workpiece W, which is also referred to as oscillation cutting or vibration cutting. Furthermore, the workpiece W in FIG. 1 rotates and the tool 11 oscillates with respect to the workpiece W. However, a configuration in which the tool 11 rotates about the center axis of the workpiece W, and the workpiece W oscillates with respect to the tool 11 may be used. Furthermore, in FIG. 1, both the feeding operation and the oscillation operation of the workpiece W are performed by a single feed shaft M1, but a configuration in which the feeding operation and the oscillation operation of the workpiece W are performed by respective feed shafts may also be used.

Further, the control part 26 of the control device 20 has a function of generating a torque command and controlling the feed shaft M1 based on a resultant command (for example, a position command value) obtained by adding the oscillation command to the position deviation, which is the difference between the position command and the actual position of the feed shaft M1. The actual position of the feed shaft M1 corresponds to a position feedback value obtained by a position detector (not shown), such as an encoder mounted on the feed shaft M1.

The control part 26 may have a function of performing learning control to obtain a correction amount of the resultant command, based on an oscillation phase obtained from the oscillation command and the above resultant command, and to add the correction amount to the resultant command.

Figure 2:
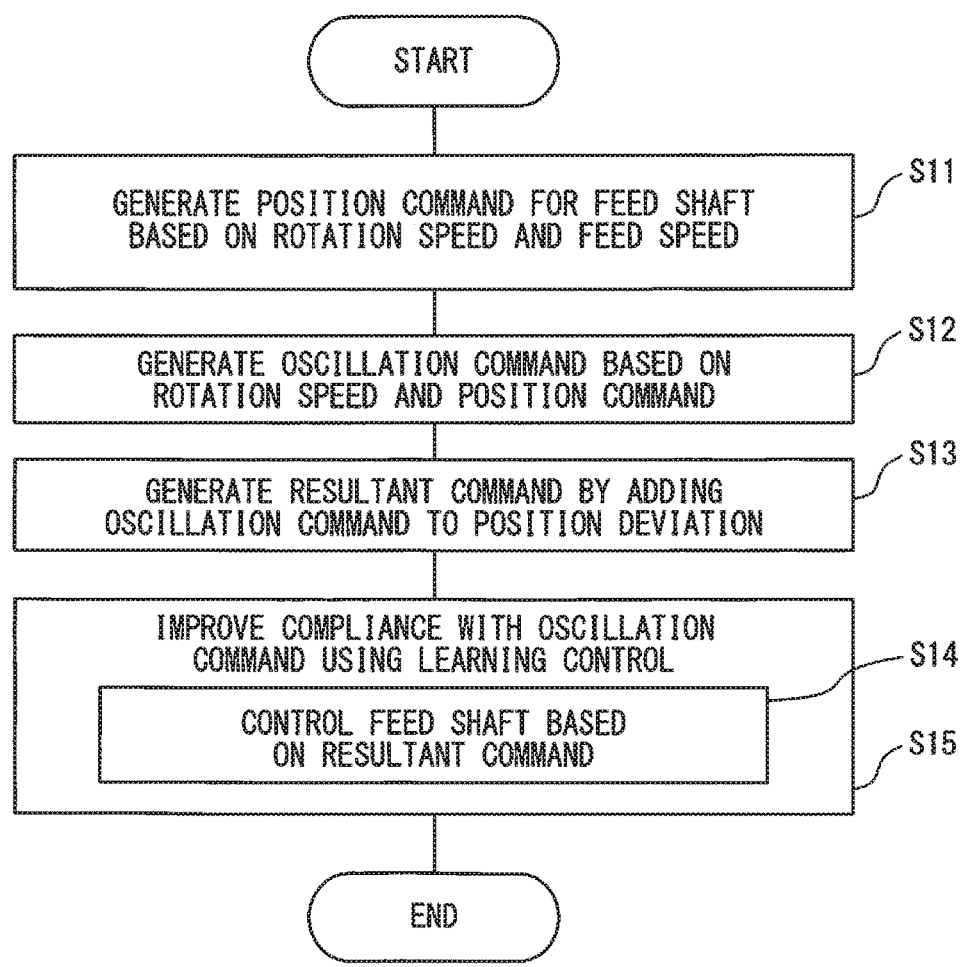
FIG. 2 is a flowchart showing the operations of a control device of the first embodiment.

FIG. 2 is a flowchart showing the operation of the control device 20 of the embodiment. First, in step S11 of FIG. 2, the position command generation part 22 generates a position command of the feed shaft M1 based on the rotation speed of the workpiece W and the feed speed of the tool 11 stored in the storage part 29.

Further, in step S12, the oscillation command generation part 23 (refer to FIG. 6) in the control part 26 generates an oscillation command based on the above-described rotation speed and feed speed. In the example shown in FIG. 1, since the tool 11 oscillates only along the center axis of rotation, only an oscillation command for the feed shaft M1 is generated.

Figure 3:
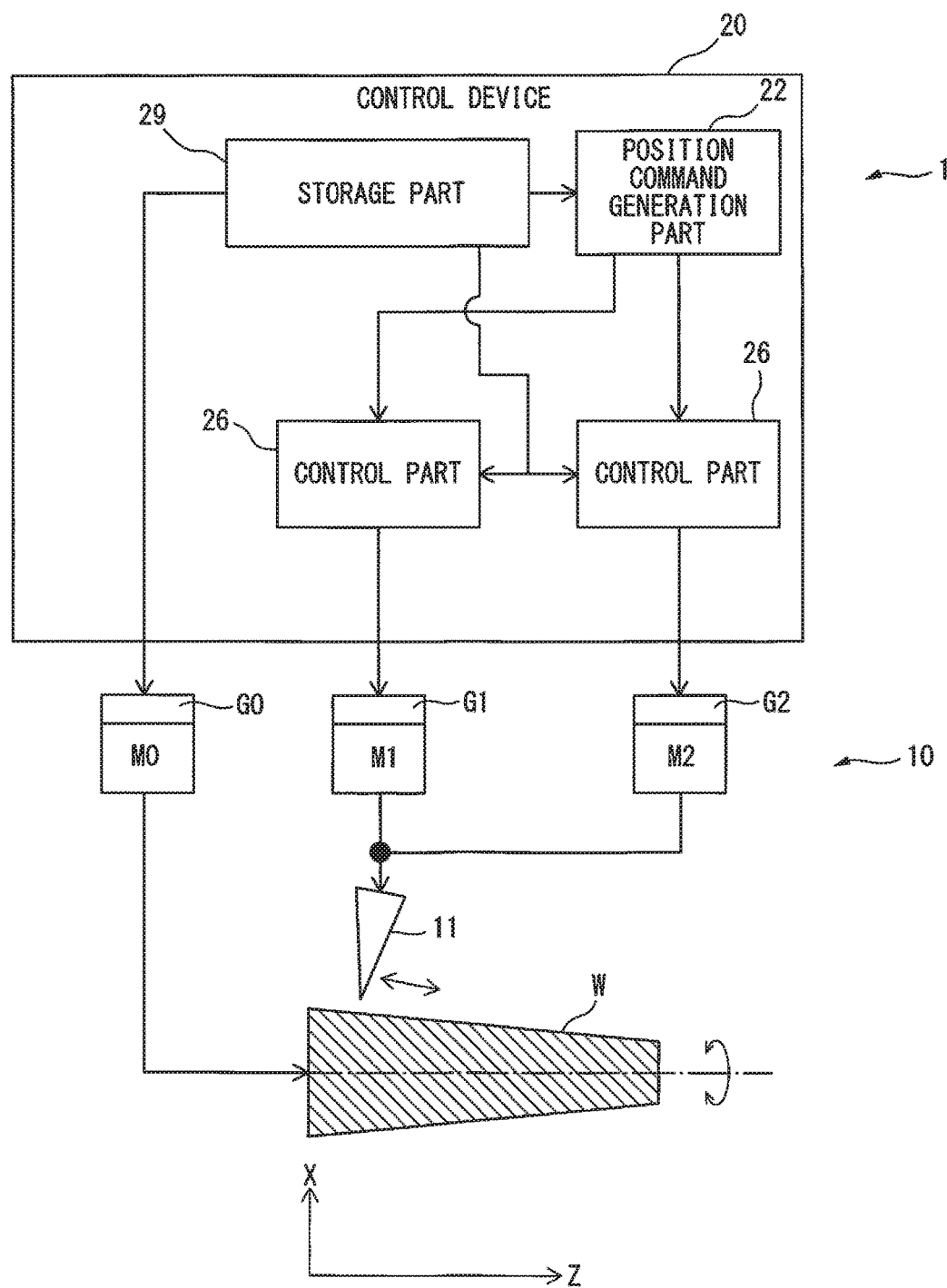
FIG. 3 is a view of another machining system including a control device of a first embodiment.

FIG. 3 shows another machining system including the control device 20 of the present embodiment. In the example shown in FIG. 3, a truncated conical workpiece W is arranged. In this case, the tool 11 is configured to cut the outer surface of the workpiece W by oscillating obliquely along the generatrix of the outer surface of the workpiece W. Since the tool 11 moves in a resultant direction of the X axis direction and the Z axis direction, in order to move the tool 11, two feed shafts M1 and M2 and control parts 26 for the respective feed shafts are required. The feed shaft M2 also includes a feed mechanism and a servomotor for driving the feed mechanism. The feed shafts M1 and M2 cooperate with the main shaft M0 and feed the tool 11 to cut the workpiece W. In such a case, in step S12, oscillation commands for the two feed shafts M1 and M2 are generated by the oscillation command generation part 23 of the control part 26 of each of the feed shafts M1 and M2.

Note that though the required torque for the feed shaft M2 can also be estimated from inertia and the angular acceleration of the command, excluding the cutting load, a detector G2 for detecting torque may be provided. Further, a configuration in which the tool 11 is fed by a plurality of feed shafts may be used.

Figure 4A:
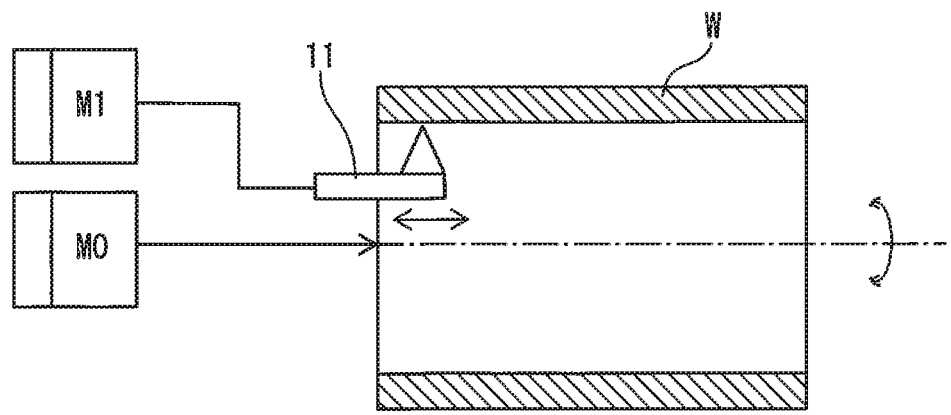
FIG. 4A is a view showing a cylindrical workpiece and a tool.

FIG. 4A shows a cylindrical workpiece and a tool different from FIG. 1. In FIG. 4, the tool 11 oscillates along the generatrix of the inner surface of the cylindrical workpiece W and cuts the inner surface thereof. In this case, since a motor used to oscillate the tool 11 is required for only the feed shaft M1, an oscillation command only for the feed shaft M1 is generated in step S12.

Figure 4B:
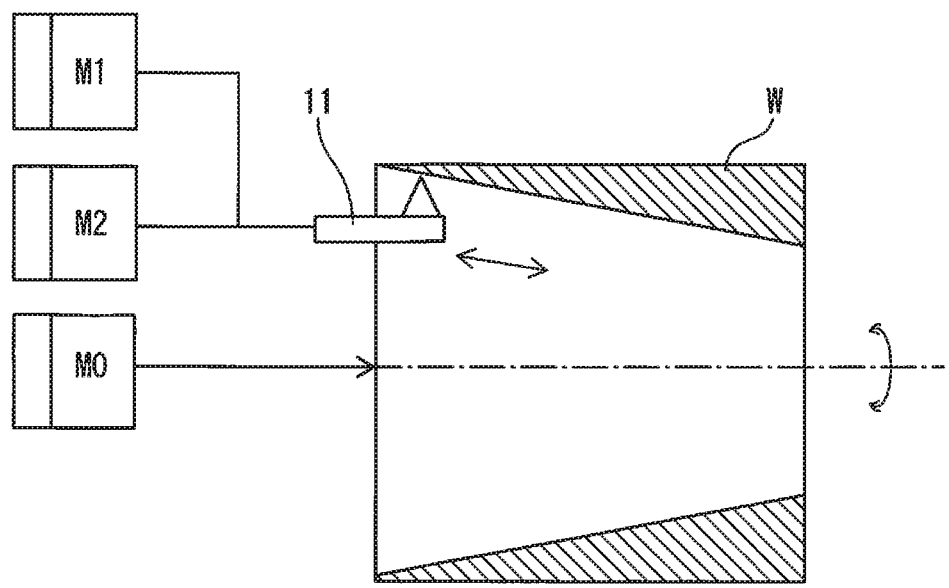
FIG. 4B is a view showing another workpiece having a frustoconical hollow portion and a tool.

In contrast thereto, FIG. 4B shows a workpiece having a frustoconical hollow portion and a tool. In FIG. 4B, the tool 11 oscillates along the generatrix of the inner surface of the workpiece W having a frustoconical hollow portion and cuts the inner surface thereof. In such a case, as described above, two feed shafts M1 and M2 and control parts 26 for the respective feed shafts are required. In step S12, the oscillation commands for the two feed shafts M1 and M2 are generated by the oscillation command generation parts 23 of the control parts 26 of the respective feed shafts M1 and M2.

A case where the tool 11 cuts the outer surface of the workpiece W as shown in FIG. 1 will be described below. The explanation below substantially applies to the shapes of the workpieces shown in FIG. 3, FIG. 4A, and FIG. 4B.

FIG. 5 shows the relationship between the feed amount and the rotation angle. In FIG. 5, the horizontal axis represents the rotation angle of the workpiece W, and the vertical axis represents the feed amount of the tool 11 in the direction of the center axis of the workpiece W (i.e., the Z axis direction). In FIG. 5, a plurality of linear dashed lines C1, C2, C3 . . . extending in the oblique direction are shown. As can be seen from FIG. 5, the vertical axis coordinate of the intersection between the dashed line C1 and the vertical axis corresponds to the vertical axis coordinate at the start point of the next dashed line C2. Similarly, the vertical axis coordinate of the intersection between the dashed line C2 and the vertical axis corresponds to the vertical axis coordinate at the start point of the next dashed line C3. The plurality of linear dashed lines C1, C2, C3 . . . indicate the trajectory of the tool 11 on the workpiece W in the absence of an oscillation command. The curves A1, A2, A3 . . . shown in FIG. 5 indicate the trajectory of the tool 11 on the workpiece W in the presence of the oscillation command. In other words, the dashed lines C1, C2, C3, etc., indicate only the position commands before the oscillation commands are added thereto (the original command values), and the curves A1, A2, A3, etc., show the position commands after the oscillation commands have been added thereto. Therefore, the curves A1, A2, A3 indicate commands obtained by adding the cosine wave-like oscillation commands to the respective position commands represented by the dashed lines C1, C2 and C3.

Furthermore, curve A1 is the trajectory of the tool 11 in the first rotation of workpiece W, curve A2 is the trajectory of tool 11 in the second rotation of workpiece W, and curve A3 is the trajectory of tool 11 in the third rotation of workpiece W. For the sake of simplicity, the trajectories of the tool 11 after the fourth rotation of the workpiece W are not shown.

In step S12 of FIG. 2, the oscillation command generation part 23 (refer to FIG. 6) in the control part 26 generates an oscillation command as follows. In the position command generation part 22, the position command (dashed lines C1, C2 and C3) of the feed shaft M1 is determined. The oscillation command generation part 23 determines the oscillation frequency of the cosine wave-like oscillation command in order to generate commands like the curves A1, A2, and A3 with the dashed lines C1, C2 and C3 as references axes. The value obtained from the expression S/60×I of Formula (1), which is described later, corresponds to the oscillation frequency.

When determining the above-described oscillation frequency, as shown in FIG. 5, it is preferable that the initial phase of the cosine wave-like curve A2 using a predetermined dashed line, for example, dashed line C2, as a reference axis deviate by a half cycle from the cosine wave-like curve A1 using the preceding dashed line, for example, dashed line C1, as the reference axis. The reason for this is that when the period deviates by a half-cycle, the oscillation amplitude of the oscillation command can be minimized, and as a result, swarf can be most efficiently shredded.

Then, the oscillation command generation part 23 determines the oscillation amplitude of the above-mentioned oscillation command in order to generate commands such as the curves A1, A2 and A3 using the dashed lines C1, C2 and C3 as reference axes. The value obtained from the expression K×F/2 in Formula (1), which will be described later, is the oscillation amplitude. Curve A1 and curve A2 shown in FIG. 5 overlap each other at portion B1, where the rotation angle is about 0 degrees, and portion B2, where the rotation angle is about 240 degrees. As can be seen from FIG. 5, the maximum values of curve A1 with respect to dashed line C1 are larger than the minimum values of curve A2 with respect to dashed line C2 at portions B1 and B2. In other words, the oscillation command generation part 23 preferably determines the oscillation amplitude so that the previous curve A1 and the succeeding curve A2 partially overlap each other. In curves A1, A2 and A3, since the feed speed is constant, the oscillation amplitude of each oscillation command is also the same.

At the overlapping portions B1 and B2, since the tool 11 separates from the workpiece W when the tool 11 is machining with the trajectory of curve A2, the workpiece W is not machined. In the present embodiment, since such overlapping portions are periodically generated, so-called intermittent cutting can be performed. In the example shown in FIG. 5, swarf is generated at each of portions B1 and B2 by the operation according to curve A2. Namely, in the second rotation curve A2, swarf is generated twice. Since such intermittent cutting is performed periodically, vibration cutting becomes possible.

Further, curve A3 formed with respect to dashed line C3 has the same shape as curve A1. Curve A2 and curve A3 overlap at portion B3 corresponding to a rotation angle of about 120 degrees and at portion B4 corresponding to a rotation angle of about 360 degrees. Swarf is generated at each of portions B3 and B4 by the operation according to curve A3. Namely, swarf is generated twice in the third rotation curve A3. Thereafter, swarf is generated twice for each rotation of the workpiece. However, no swarf is generated in the first rotation.

By setting the oscillation frequency and the oscillation amplitude in this manner, the oscillation command generation part 23 (refer to FIG. 6) in the control part 26 generates the oscillation command (step S12).

For example, the oscillation command is represented by the following formula.

$$\text{Oscillation command} = (K \times F/2) \times \cos(2\pi \times S/60 \times I \times t) - (K \times F/2) \quad \text{Formula (1)}$$

In Formula (1), K is the oscillation amplitude magnification, F is the movement amount of the tool 11 per rotation of the workpiece W, i.e., the feed amount per rotation [mm/rev], S is the rotation speed [min$^{-1}$], or [rpm] around the center axis of workpiece W, and I is the oscillation frequency magnification. The aforementioned oscillation frequency corresponds to the expression S/60×I in Formula (1), and the aforementioned oscillation amplitude corresponds to the expression K×F/2 in Formula (1). The oscillation amplitude magnification K is an integer of 1 or more, and the oscillation frequency magnification I is a non-integer larger than zero (for example, a positive non-integer such as 0.5, 0.8, 1.2, 1.5, 1.9, 2.3, or 2.5, . . . , etc.). The oscillation amplitude magnification K and the oscillation frequency magnification I are constant (in the example of FIG. 5, I is 1.5).

The reason why the oscillation frequency magnification I is not an integer is that in the case of an oscillation frequency which is exactly the same as the rotation number of workpiece W around the center axis, it is impossible to generate the overlapping portions B1, B2, B3, B4 and the like described above, and an effect of shredding swarf through oscillation cutting cannot be obtained.

Furthermore, according to Formula (1), the oscillation command is a command in which the expression (K×F/2) is subtracted as an offset value from the cosine waves using dashed lines C1, C2 and C3 as reference axes indicating the position command. Thus, the positional trajectory of the tool 11 based on the command value obtained by adding the oscillation command to the position command can be controlled with the position by the position command as the upper limit in the machining feed direction of the tool 11. Therefore, curves A1, A2, A3, etc., in FIG. 7 are such that the dashed lines C1, C2, C3, etc., are not exceeded in the positive Z axis direction (i.e., the machining feed direction of the tool 11).

Further, using an oscillation command as represented by Formula (1), large oscillation commands are not issued from the start in the feed direction of the tool 11 at the machining start point (0 degrees on the horizontal axis) of the tool 11, as can be seen from curve A1 in FIG. 5.

Note that, the initial value of each parameter (K and I in Formula (1)) adjusted when defining the oscillating frequency and the oscillating amplitude is stored in the storage part 29 before the machine tool 10 is operated. The rotation speed (S) of the workpiece W is stored in advance as a machining condition in the storage part 29. The feed amount per rotation F is obtained from the rotation speed (S) and the position command generated by the position command generation part 22.

Thereafter, in step S13 of FIG. 2, the control part 26 obtains the position deviation, which is the difference between the position command generated by the position command generation part 22 shown in FIG. 1 and the actual position of the feed shaft M1, and adds the above oscillation command to the position deviation to obtain a resultant command.

Then, in step S14 of FIG. 2, the control part 26 controls the feed shaft M1 based on the aforementioned resultant command. The main shaft M0 is controlled by the control device 20 in accordance with the rotation speed (S) of the workpiece W stored in the storage part 29. In the present embodiment, there is no need to generate a table of vibration cutting information in advance, and from the machining conditions of the workpiece W, it is possible to determine the shredding conditions of the workpiece W prior to actually cutting the workpiece W.

When there is backlash in the drive mechanism portion of the tool 11 or when the rigidity of the drive mechanism portion is low, if the control gain is set high in order to improve the responsiveness of the servo, vibration may occur and the positional accuracy of the tool 11 may not be stable. For example, even if the feed shaft M1 is driven based on command values corresponding to curves A1, A2, A3, etc., the actual position of the tool 11 may not completely follow curves A1, A2, A3, etc., in some cases. In such a case, if the actual position of the tool 11 does not coincide with the command values, such as the curves A1, A2, A3 etc., at the overlapping portions B1, B2, B3, B4, etc., shown in FIG. 5, intermittent cutting will not occur and as a result, swarf cannot be satisfactorily formed.

Thus, in the present embodiment, learning control is used to improve compliance with the oscillation command, as shown in step S15 of FIG. 2. Learning control is a control method that improves compliance with a "periodic command with a predetermined repeated pattern", and the position deviation can be decreased as the cycle progresses from the first cycle to the second cycle, the second cycle to the third cycle, etc. Specifically, position deviations for a predetermined number of oscillation cycles of the workpiece W and the tool 11 are learned and set as correction amounts, thereby preventing an increase in periodic position deviation caused by the oscillation command. In other words, for example, as the learning cycle, it is possible to use a cycle (for example, 1 oscillation cycle=1/oscillation frequency) obtained from the oscillation frequency of the oscillation command of the above-described Formula (1). The control part 26 calculates the correction amount of the resultant command at each phase obtained by converting the oscillation cycle into a cycle per angle of rotation and dividing the cycle per rotation angle by a predetermined division number. In the control part 26, the correction amount of the resultant command is obtained for each phase and those for one learning cycle are stored, and by adding the correction amount at each phase before one learning cycle to the current resultant command for each phase, the position deviation included in the resultant command can be reduced to nearly zero.

As a result, the actual position of the tool 11 gradually approaches the command value curves A1, A2, A3, etc., and ultimately coincides with the command value curves A1, A2, A3, etc. In such a case, since the command value curves A1, A2, A3, etc., have overlapping portions B1, B2, B3, B4, etc., as described above, intermittent cutting can be reliably performed, and the swarf can be reliably shredded.

Furthermore, learning bandwidth for learning control has an upper limit, and when the oscillation frequency exceeds the upper limit, learning does not converge and position deviation remains. As a result, swarf is not satisfactorily formed. Therefore, in the present embodiment, it is necessary to obtain an optimum oscillation frequency within a range where learning control can be performed.

Specifically, similarly to a torque reduction method, the oscillation frequency of the oscillation command can be kept low by adjusting (lengthening) the length of the swarf, as described later, and the learning bandwidth can be accommodated. Of course, if modification of machining conditions is possible, the rotation speed of the main shaft M0 (i.e., the rotation speed of workpiece W) may be reduced.

Furthermore, in the oscillation cutting of the present embodiment, since the optimum oscillation frequency and oscillation amplitude are obtained, the required torque can be minimized. However, if the required torque can be minimized, torque saturation can occur, which must be prevented. Further, when learning control is applied, the torque increases and torque saturation becomes more likely to occur. Thus, in the present embodiment, it is necessary to obtain an optimum oscillation frequency and oscillation amplitude within a range which will not cause torque saturation.

The oscillation amplitude is preferably as small as possible so that when the oscillation frequency is low, longer swarf is formed. At such a time, the torque required for the feed shafts M1, M2, etc., can be small. Conversely, when the oscillation amplitude is large, the torque required for the feed shafts M1, M2, etc., also increases. When the oscillation frequency is high, the length of the swarf becomes short, and the torque required for the feed shafts M1, M2, etc., also increases.

When an operator requires a desired length of swarf, the operator can enter the desired length of the swarf into the oscillation command generation part 23. As a result, the oscillation command generation part 23 generates the oscillation frequency and the oscillation amplitude based on the desired swarf length. For example, when short swarf is requested, damage to the workpiece W can be prevented, and when long swarf is requested, the load on the tool 11 can be reduced by suppressing the torque and learning bandwidth, allowing for learning to more easily converge.

Figure 6:
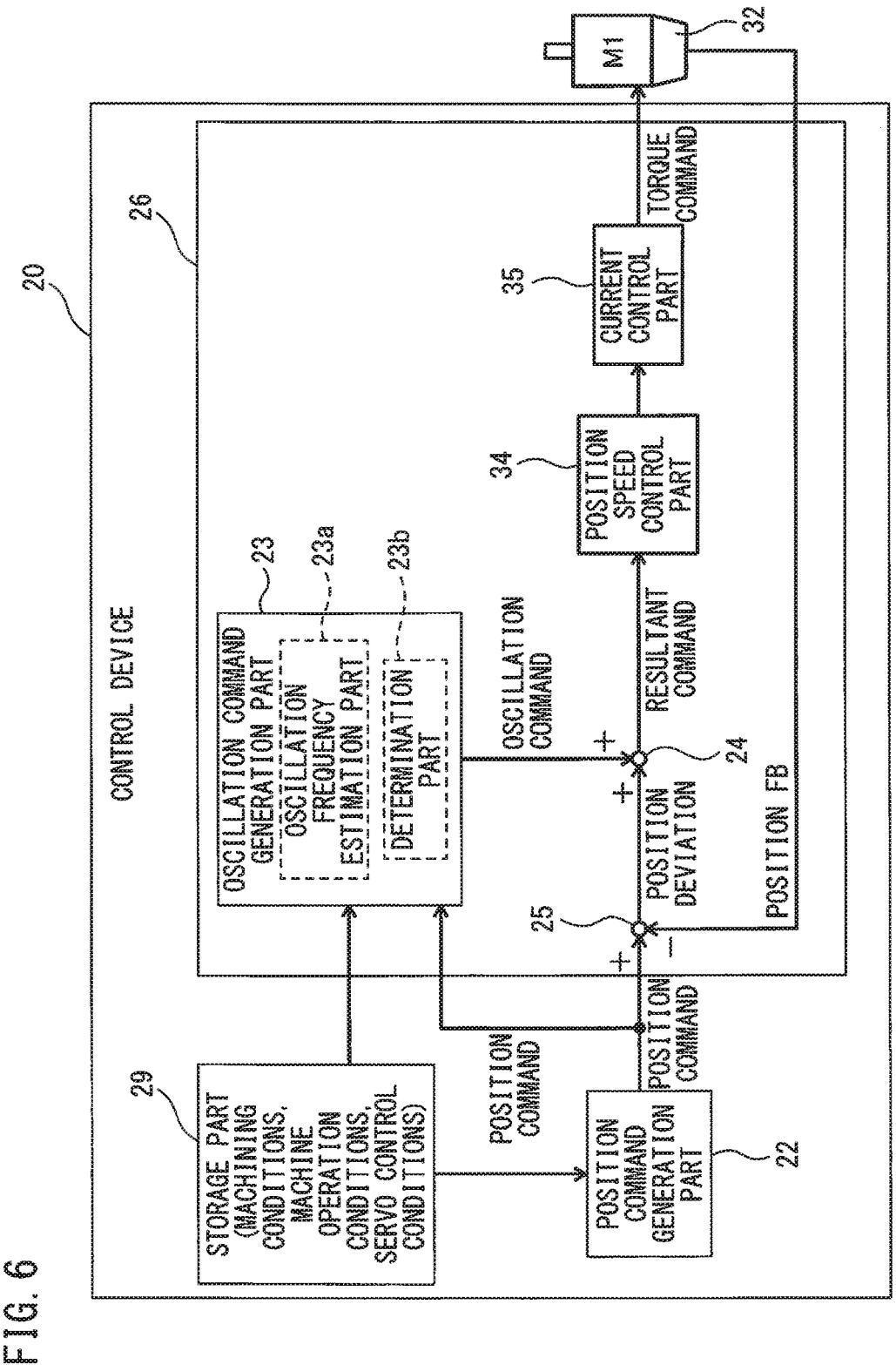
FIG. 6 is a block diagram showing a more specific configuration example of the control devices shown in FIGS. 1 and 3.

FIG. 6 is a block diagram showing a more specific configuration example of the control devices 20 shown in FIGS. 1 and 3.

The control device 20 shown in FIG. 6 includes the storage part 29, the position command generation part 22, and the control part 26 (feed shaft control part). The storage part 29 and the position command generation part 22 may be provided in a host computer (not shown), such as an NC device connected to the control device 20.

The control part 26 includes the oscillation command generation part 23, an addition part 24, a subtraction part 25, a position speed control part 34, and a current control part 35. An encoder 32 for detecting the rotational position and rotation speed of the feed shaft M1 is mounted on the feed shaft M1 for moving the tool 11 in the machining feed direction.

Further, the oscillation command generation part 23 includes an oscillation command estimation part 23a which estimates the oscillation amplitude and oscillation frequency of the oscillation command based on the rotation speed (s) stored as a machining condition in the storage part 29 and the position command generated by the position command generation part 22, and a determination part 23b which determines whether or not the estimated oscillation frequency is the optimum value based on the machining operation conditions and servo control conditions stored in the storage part 29. Note that the machining conditions, machining operation conditions, and servo control conditions are as previously described.

The determination part 23b calculates the maximum oscillation acceleration and the maximum oscillation jerk based on the estimated oscillation amplitude and oscillation frequency, and determines whether or not the maximum oscillation acceleration and the maximum oscillation jerk satisfy the aforementioned machining operation conditions and whether or not the estimated oscillation frequency satisfies the aforementioned servo control conditions.

As a result of the determination, when either of the aforementioned machining operation conditions and servo control conditions are not satisfied, the determination part 23b changes the aforementioned positive non-integer (I) to a different value using the oscillation command estimation part 23a, again estimates the oscillation frequency, and performs the above determination. Conversely, when both of the aforementioned machining operation conditions and servo control conditions are satisfied, the determination part 23b sets the estimated oscillation frequency as the optimum value of the oscillation frequency.

When the determination part 23b determines that the estimated oscillation frequency is the optimum value, the oscillation command generation part 23 generates the oscillation command based on the optimum value of the oscillation frequency and the estimated oscillation amplitude.

Note that, the control part 26 of the control device 20 may be provided with a learning controller (not shown) which performs learning control as described above. In such a case, the control part 26 is configured to input the resultant command immediately after being output from the addition part 24 to the learning controller, and to add the correction amount obtained by the learning controller to the resultant command immediately prior to being input to the position speed control part 34. The addition part 24 may be incorporated in the control part 26. Though the resultant command is input to the learning controller, since the resultant command contains the difference between the position command and the position feedback value, it is generally the same as the position deviation input to the learning controller.

FIG. 7 is a flowchart showing the operations of the control device 20 shown in FIG. 6.

First, in step S21 of FIG. 7, the control device 20 determines the presence or absence of a command to start oscillation cutting. When a command to start oscillation cutting is present, oscillation cutting begins, and when such a command is not present, machining of the workpiece W ends.

When oscillation cutting begins, the position command generation part 22 shown in FIG. 6 generates a position command instructing the feed shaft M1 of the position of the tool 11 in the machining feed direction based on the rotation speed of the workpiece W and the feed speed of the tool 11 stored as the machining conditions in the storage part 29, and transmits the position command to the subtraction part 25 at predetermined time intervals. The above predetermined time intervals may be the control period (sampling period) of the control part 26, or may be some another period.

The subtraction part 25 calculates the position deviation, which is the difference between the position command transmitted from the position command generation part 22 and the position feedback value (position FB) output from the encoder 32 of the feed shaft M1, and transmits the position deviation to the addition part 24.

Then, in step S22 of FIG. 7, the oscillation command generation part 23 generates an oscillation command based on the above-described Formula (1), and transmits the oscillation command to the addition part 24 at the above predetermined time intervals. The oscillation command is calculated by the oscillation command estimation part 23a in the oscillation command generation part 23.

For example, the oscillation command estimation part 23a obtains the rotation speed (S) of workpiece W stored as a machining condition in the storage part 29 and the position command of feed shaft M1 generated by the position command generation part 22, and obtains the feed amount (F) per rotation of the tool 11 from the position command and the rotation speed (S). The oscillation command estimation part 23a estimates the oscillation amplitude p (K×F/2) by multiplying the feed amount (F) per rotation by a predetermined constant (K). The oscillation command estimation part 23a estimates the value obtained by multiplying the rotation speed (S) of workpiece W obtained from the storage part 29 by an arbitrary positive non-integer (I) as the oscillation frequency f (S/60×I).

Further, the determination part 23b determines whether or not the maximum oscillation acceleration $A_0$ and the maximum oscillation jerk $J_0$ calculated from the estimated oscillation amplitude p and oscillation frequency f satisfy the aforementioned machining operation conditions. The machining operation conditions, such as the maximum oscillation acceleration $A_0$<the maximum acceleration $A_{max}$ and the maximum oscillation jerk $J_0$<the maximum jerk $J_{max}$, are stored in the storage part 29. In other words, the machining operation conditions are conditions for preventing the creation of an oscillation command that will cause unacceptable acceleration or jerk for the moving object when actually moved. The determination part 23b confirms the oscillation command estimated by the estimation part 23a based on such machining operation conditions.

Specifically, in step S23 of FIG. 7, the determination part 23b calculates the maximum oscillation acceleration $A_0$ and the maximum oscillation jerk $J_0$ using Formula (2) and Formula (3) described below based on the estimated oscillation amplitude and oscillation frequency estimated using the oscillation command estimation part 23a.

Maximum Oscillation Acceleration $A_0$=Oscillation Amplitude $p \times (2\pi \times$Oscillation Frequency $f)^2$     Formula (2)

Maximum Oscillation Jerk $J_0$=Oscillation Amplitude $p \times (2\pi \times$Oscillation Frequency $f)^3$     Formula (3)

The oscillation amplitude p is estimated using the value obtained from the expression (K×F/2) in the aforementioned Formula (1), and the oscillation frequency f is estimated using the value obtained from the expression (S/60×I) of Formula (1).

Then, in step S24, the determination part 23b calculates the maximum acceleration $A_{max}$ and the maximum jerk $J_{max}$ of the moving object actually moved by the feed shaft M1, or obtains the maximum acceleration $A_{max}$ and the maximum jerk $J_{max}$ from the storage part 29 or a host computer (not shown).

When the feed shaft M1 includes a linear motor, the maximum acceleration $A_{max}$ can be obtained from the maximum thrust of the linear motor and the weight of the moving object moved by the linear motor using Formula (4) below.

Maximum Acceleration $A_{max}$=Maximum Thrust of the Motor/Weight of the Moving Object     Formula (4)

When the feed shaft M1 includes a rotary motor, the maximum acceleration $A_{max}$ can be obtained from the maximum torque of the rotary motor and the inertia of the moving object moved by the rotary motor using Formula (5) below.

Maximum Acceleration $A_{max}$=Maximum Torque of the Motor/Inertia of the Moving Object     Formula (5)

When the maximum acceleration $A_{max}$ is calculated in the determination part 23b, the maximum thrust of the motor, the weight of the moving object, the maximum torque of the motor, the inertia of the moving object, etc., described above are obtained in advance by experimentation, simulation, etc., in accordance with the configuration of the machine tool 10 and are stored in the storage part 29.

Furthermore, the maximum acceleration $A_{max}$ is obtained in advance using a host computer (not shown) and is stored in the host computer or the storage part 29. The determination part 23b may be configured to obtain the maximum acceleration $A_{max}$ from the host computer or storage part 29.

Since the motor thrust or motor torque that can actually be used for acceleration decreases due to friction, the value obtained by subtracting a thrust or torque component corresponding to the friction from the maximum thrust of the linear motor or the maximum torque of the rotary motor may be used as the value of the numerator of Formula (4) or (5) to obtain the maximum acceleration $A_{max}$.

Further, the aforementioned maximum jerk $J_{max}$ is the allowable shock (jerk) of the moving object which is moved by the linear motor or rotary motor. The maximum jerk $J_{max}$ is obtained by integrating the maximum acceleration $A_{max}$ in the determination part 23b one time. Alternatively, the maximum jerk $J_{max}$ may be determined in advance by experimentation, calculation, etc., and stored in the storage part 29, whereby the determination part 23b may acquire the maximum jerk $J_{max}$ from the storage part 29.

Then, in step S25, the determination part 23b determines whether or not the maximum oscillation acceleration $A_0$ calculated using the above Formula (2) is smaller than the maximum acceleration $A_{max}$ obtained from the above Formula (4) or Formula (5) (Maximum Oscillation Acceleration $A_0$<Maximum Acceleration $A_{max}$).

As a result, when the maximum oscillation acceleration $A_0$ is equal to or greater than the maximum acceleration $A_{max}$, the determination part returns to step S22, changes the above positive non-integer (I) to a different value, again estimates the oscillation frequency f, and performs the processing of the above step S22 to step S24 again. Conversely, when the maximum oscillation acceleration $A_0$ is smaller than the maximum acceleration $A_{max}$, the determination part 23b performs the processing of the next step S26.

In step S26, the determination part 23b determines whether or not the maximum oscillation jerk $J_0$ calculated using the above Formula (3) is smaller than the above maximum jerk $J_{max}$ (Maximum Oscillation jerk $J_0$<Maximum Jerk $J_{max}$).

As a result, when the maximum oscillation jerk $J_0$ is greater than or equal to the maximum jerk $J_{max}$, the determination part 23b returns to step S22, changes the above positive non-integer (I) to a different value, again estimates the oscillation frequency f, and performs the processing of the above step S22 to step S25 again. Conversely, when the maximum oscillation jerk $J_0$ is smaller than the maximum jerk $J_{max}$, the determination part 23b performs the processing of the next step S27.

Further, the determination part 23b determines whether or not the oscillation frequency f estimated using the estimation part 23a satisfies the aforementioned servo control conditions. The servo control conditions, such as control frequency $f_c$/oscillation frequency f≥a constant, are stored in the storage part 29. For example, when the oscillation frequency is set to 100 kHz for a control frequency of 1 kHz, the number of command values that can be generated in 1 oscillation period ($T_0$) is 10. However, when learning control is applied to oscillation cutting, there are cases where effective control cannot be performed unless the number of command values is set to 20 or more. Thus, the aforementioned servo control conditions are defined in consideration of such a case. However, this is only an example, and the servo control conditions used for the present invention are not limited to servo control conditions which take learning control into account.

The determination part 23b confirms the oscillation command estimated by the estimation part 23a based on such servo control conditions.

Specifically, in step S27, the determination part 23b determines whether or not the result obtained by dividing the predetermined control frequency $f_c$ by the estimated oscillation frequency f is equal to or greater than a predetermined value (control frequency $f_c$/oscillation frequency≥constant (e.g., 20)).

As a result, when the above division result is smaller than the above predetermined value, the determination part 23b returns to step 22, changes the above positive non-integer (I) to a different value, and performs the processing of the above step S22 to step S26 again. Conversely, when the above division result is equal to or greater than the above predetermined value, the determination part 23b determines that the oscillation frequency f calculated using the changed positive non-integer (I) is the optimum value, and the oscillation command generation part 23 generates the oscillation command using the optimum value of the oscillation frequency and the estimated oscillation amplitude p (step S28 in FIG. 7) and sends the oscillation command to the addition part 24. At such a time, the control device 20 may notify a display device, personal computer, etc., outside the control device 20 that the oscillation frequency f is the optimum value.

Note that, when changing the positive non-integer (I: oscillation frequency magnification factor) to another value in the aforementioned step S22, etc., a constant value is added to a predetermined initial value.

Then, in step S29, the addition part 24 adds the oscillation command input from the determination part 23b to the position deviation output from the subtraction part 25. At such a time, the position deviation and the oscillation command are input to the addition part 24 at the same time as the aforementioned predetermined time intervals and are added. The addition part 24 sends the resultant command (position command value) obtained by adding the oscillation command to position deviation to the position speed control part 34.

The position speed control part 34 generates a speed command based on the resultant command and supplies the speed command to the current control part 35. The current control part 35 converts the speed command into a torque command and supplies the torque command to the feed shaft M1. The feed shaft M1 is controlled based on such a command. When the feed shaft M1 rotates, the actual position of the feed shaft M1 is fed back to the subtraction part 25 from the encoder 32 mounted on the feed shaft M1. If the difference between the position command value and the position feedback value from the resultant command is eliminated, it is determined that the actual position of the feed shaft M1 has reached the position command value.

Then, in step S30, the presence or absence of an oscillation cutting end command is determined, and if an oscillation cutting end command has been issued, cutting of the workpiece W ends. Conversely, if an oscillation cutting end command has not been issued, the above-described series of processes from step S28 to step S30 is repeated.

As explained above, according to the control device 20 of the present embodiment, even if at least one of the machining conditions, the machining operation conditions, and the servo control conditions is changed in the machine tool 10 which performs oscillation cutting, an oscillation command can be created by automatically determining the optimum oscillation frequency according to these conditions. As a result, it is possible to reduce the load on the operator and to realize oscillation cutting to shred swarf as intended.

Although the present invention has been described above with reference to exemplary embodiments, a person skilled in the art would understand that the above-described modifications of the embodiments and various other modifications, omissions, and additions can be made without departing from the scope of the present invention.

Furthermore, in order to solve the at least one problem of the present disclosure, various embodiments and the effects thereof described below can be provided.

The first aspect of the present disclosure provides a control device (20) for controlling a machine tool (10) for cutting an outer peripheral surface or an inner peripheral surface of a workpiece (W) with a tool (11), the machine tool having a main shaft (M0) for performing a relative rotation between the workpiece (W) and the tool (11) around a central axis of the workpiece (W), and at least one feed shaft (M1, M2) for performing a relative feeding between the tool (11) and the workpiece (W) along a generatrix of the outer peripheral surface or the inner peripheral surface of the workpiece (W), the control device comprising:

a position command generation part (22) for generating a position command for the at least one feed shaft (M1, M2) based on a relative rotation speed of the workpiece (W) and the tool (11) and a relative feed speed of the tool (11) and the workpiece (W);

a feed shaft control part (26) that controls the at least one feed shaft (M1, M2) according to the position command; and a storage part (29) for storing the rotation speed, the feed speed, machining operation conditions under which oscillation is performed using the feed shaft (M1, M2), and servo control conditions for the control device (20); wherein the feed shaft control part (26) includes an oscillation command generation part (23) that generates an oscillation command for the at least one feed shaft (M1, M2) such that the tool (11) intermittently cuts the workpiece (W) at an oscillation frequency which is a positive non-integral multiple of the rotation speed, and the feed shaft control part is configured to control the at least one feed shaft (M1, M2) based on a resultant command obtained by adding the oscillation command to a position deviation, which is a difference between the position command and an actual position of the at least one feed shaft (M1, M2);

the oscillation command generation (23) part includes an estimation part (23a) for estimating an oscillation amplitude and an oscillation frequency of the oscillation command based on the rotation speed and the position command, and a determination part (23b) for determining whether or not the oscillation frequency is an optimum value based on the machining operation conditions and the servo control conditions; and when the determination part (23b) determines that the oscillation frequency is an optimum value, the oscillation command is generated based on the optimum value of the oscillation frequency and the oscillation amplitude.

The second aspect of the present disclosure provides the control device (20) of the above first aspect, wherein the estimation part (23a) estimates the oscillation amplitude based on the rotation speed and the position command, and estimates a value obtained by multiplying the rotation speed by an arbitrary positive non-integer as the oscillation frequency; and the determination part (23b) calculates a maximum oscillation acceleration and a maximum oscillation jerk based on the estimated oscillation amplitude and the estimated oscillation frequency, determines whether or not the maximum oscillation acceleration and the maximum oscillation jerk satisfy the machining operation conditions, and the estimated oscillation frequency satisfies the servo control conditions, and as a result of the determination, when either of the machining operation conditions or the servo control conditions are not satisfied, the estimation part (23a) changes the positive non-integer to another value, and again estimates the oscillation frequency and the determination part performs the determination, and when both the machining operation conditions and the servo control conditions are satisfied, the estimated oscillation frequency is set as the optimum value of the oscillation frequency.

The third aspect of the present disclosure provides the control device (20) of the above second aspect, wherein the machining operation conditions include conditions in which, when the feed shaft (M1, M2) includes a linear motor, the maximum oscillation acceleration is smaller than a maximum acceleration obtained from a maximum thrust of the linear motor and a weight of a moving object moved by the linear motor; or when the feed shaft (M1, M2) includes a rotary motor, the maximum oscillation acceleration is smaller than a maximum acceleration obtained from a maximum torque of the rotary motor and inertia of a moving object moved by the rotary motor; and the maximum oscillation jerk is smaller than a maximum jerk allowable for each moving object; and the servo control conditions include conditions in which a value obtained by dividing a control frequency determined in advance for the feed shaft control part (26) by the estimated oscillation frequency is not smaller than a predetermined value.

The fourth aspect of the present disclosure provides the control device (20) of any of the above first aspect through the third aspect, wherein the estimation part (23a) calculates, for each rotation of one of the tool (11) and the workpiece (W), the movement amount of the other of the tool (11) and the workpiece (W), based on the rotation speed and the position command, and sets a value obtained by multiplying the movement amount by a predetermined constant as the oscillation amplitude.

According to the above first aspect through the fourth aspect, in a machine tool performing oscillation cutting, when generating a periodic oscillation command that oscillates a tool and a workpiece relative to each other, the optimum value of the oscillation frequency of the oscillation command can be automatically obtained according to machining conditions, machining operation conditions, and servo control conditions.

The fifth aspect of the present disclosure provides the control device (20) of any of the above first aspect through the fourth aspect, wherein the oscillation command generation part (23) generates the oscillation command in which the oscillation amplitude is subtracted as an offset value with respect to a reference axis of the cosine wave.

According to the above fifth aspect, the position of the tool based on the command value after the oscillation command is added to the position command can be controlled with the position command being the target position in the machining feed direction of the tool as the upper limit.

The sixth aspect of the present disclosure provides the control device (20) of any of the above first aspect through the fifth aspect, wherein the oscillation command generation part (23) generates an oscillation frequency of the oscillation command so that the workpiece or the tool is shifted by a half-cycle each time the workpiece or the tool makes one revolution based on the rotation speed, and generates the oscillation amplitude of the oscillation command based on the position command.

According to the above sixth aspect, since the oscillation frequency of the oscillation command is shifted by a half-cycle each time the workpiece or the tool makes one revolution, the oscillation amplitude can be minimized. As a result, intermittent cutting can be efficiently performed.

The seventh aspect of the present disclosure provides the control device (20) of any of the above first aspect through the sixth aspect, wherein the oscillation command generation part (23) generates the oscillation frequency and the oscillation amplitude of the oscillation command such that the torque of the at least one feed shaft (M1, M2) does not exceed a predetermined value.

According to the above seventh aspect, when the feed shaft is driven by, for example, a rotary motor based on the position command after the oscillation command has been added thereto, torque saturation of the rotary motor can be prevented.

The eight aspect of the present disclosure provides the control device (20) of any of the above first aspect through the seventh aspect, wherein the oscillation command generation part (23) generates an oscillation frequency and an oscillation amplitude of the oscillation command based on a desired length of swarf generated by the tool (11) machining the workpiece (W).

According to the above eighth embodiment, when short swarf is requested, the formation of cuts on the workpiece can be prevented, and when long swarf is requested, it is possible to suppress the torque and reduce the load on the tool.

The invention claimed is:

1. A control device for controlling a machine tool for cutting an outer peripheral surface or an inner peripheral surface of a workpiece with a tool, the machine tool having a spindle for performing a relative rotation between the workpiece and the tool around a central axis of the workpiece, at least one feed shaft for performing a relative feeding between the tool and the workpiece along a generatrix of the outer peripheral surface or the inner peripheral surface of the workpiece, and a position detector for detecting an actual position of the at least one feed shaft, the control device comprising:
   a position command generation part for generating a position command for the at least one feed shaft based on a relative feed speed of the tool and the workpiece;
   a feed shaft control part that controls the at least one feed shaft according to the position command; and
   a storage part for storing the rotation speed, the feed speed, machining operation conditions under which oscillation is performed using the feed shaft, and servo control conditions for the control device; wherein
   the machining operation conditions include the condition that a maximum oscillation acceleration and a maximum oscillation jerk which are determined from an oscillation frequency and oscillation amplitude of an oscillation command for oscillating the tool and the workpiece relative to each other are less than a maximum acceleration and maximum jerk of an actually-moved moving object;
   the servo control conditions include the condition that a value obtained by dividing a control frequency obtained from a predetermined control cycle when a command is issued to the feed shaft by an oscillation frequency of the oscillation command is not less than a predetermined value;
   the feed shaft control part includes an oscillation command generation part that generates an oscillation command for the at least one feed shaft such that a number of oscillations of the tool per rotation of the spindle becomes a positive non-integral multiple and the tool intermittently cuts the workpiece, and the feed shaft control part is configured to control the at least one feed shaft based on a resultant command obtained by adding the oscillation command to a position deviation, which is a difference between the position command and the actual position of the at least one feed shaft detected by the position detector; and
   the oscillation command generation part includes an estimation part for estimating an oscillation amplitude and an oscillation frequency of the oscillation command based on the rotation speed and the position command, and a determination part for determining whether or not the machining operation conditions and the servo control conditions are satisfied, and when the determination part determines that the machining operation conditions and the servo control conditions are satisfied, the oscillation command is generated based on the oscillation frequency and the oscillation amplitude.

2. The control device according to claim 1, wherein the estimation part estimates the oscillation amplitude based on the rotation speed and the position command, and estimates a value obtained by multiplying the rotation speed by an arbitrary positive non-integer as the oscillation frequency; and
   the determination part calculates a maximum oscillation acceleration and a maximum oscillation jerk based on the estimated oscillation amplitude and the estimated oscillation frequency, determines whether or not the maximum oscillation acceleration and the maximum oscillation jerk satisfy the machining operation conditions, and the estimated oscillation frequency satisfies the servo control conditions, and as a result of the determination, when either of the machining operation conditions or the servo control conditions are not satisfied, the estimation part changes the positive non-integer to another value, and again estimates the oscillation frequency and the determination part performs the determination, and when both the machining operation conditions and the servo control conditions are satisfied, the estimated oscillation frequency is set as the optimum value of the oscillation frequency.

3. The control device according to claim 1, wherein the determination part calculates the maximum oscillation acceleration and the maximum oscillation jerk based on the oscillation amplitude and the oscillation frequency estimated by the estimation part, and determines whether or not the maximum oscillation acceleration and the maximum oscillation jerk satisfy the machining operation conditions and whether or not the estimated oscillation frequency satisfies the servo control conditions, and
   when the determination part determines that the machining operation conditions and the servo control conditions are satisfied, the oscillation command generation part generates the oscillation command based on the oscillation frequency and the oscillation amplitude.

4. The control device according to claim 1, wherein the estimation part calculates, for each rotation of one of the tool and the workpiece, the movement amount of the other of the tool and the workpiece, based on the rotation speed and the position command, and sets a value obtained by multiplying the movement amount by a predetermined constant as the oscillation amplitude.

5. The control device according to claim 1, wherein the oscillation command generation part generates the oscillation command in which the oscillation amplitude is subtracted as an offset value with respect to a reference axis of the cosine wave.

6. The control device according to claim 1, wherein the oscillation command generation part generates an oscillation frequency of the oscillation command so that the workpiece or the tool is shifted by a half-cycle each time the workpiece or the tool makes one revolution based on the rotation speed, and generates the oscillation amplitude of the oscillation command based on the position command.

7. The control device according to claim 1, wherein the oscillation command generation part generates the oscillation frequency and the oscillation amplitude of the oscillation command such that the torque of the at least one feed shaft does not exceed a predetermined value.

8. The control device according to claim 1, wherein the oscillation command generation part generates an oscillation frequency and an oscillation amplitude of the oscillation command based on a desired length of swarf generated by the tool machining the workpiece.

* * * * *